United States Patent Office 3,289,219
Patented Dec. 6, 1966

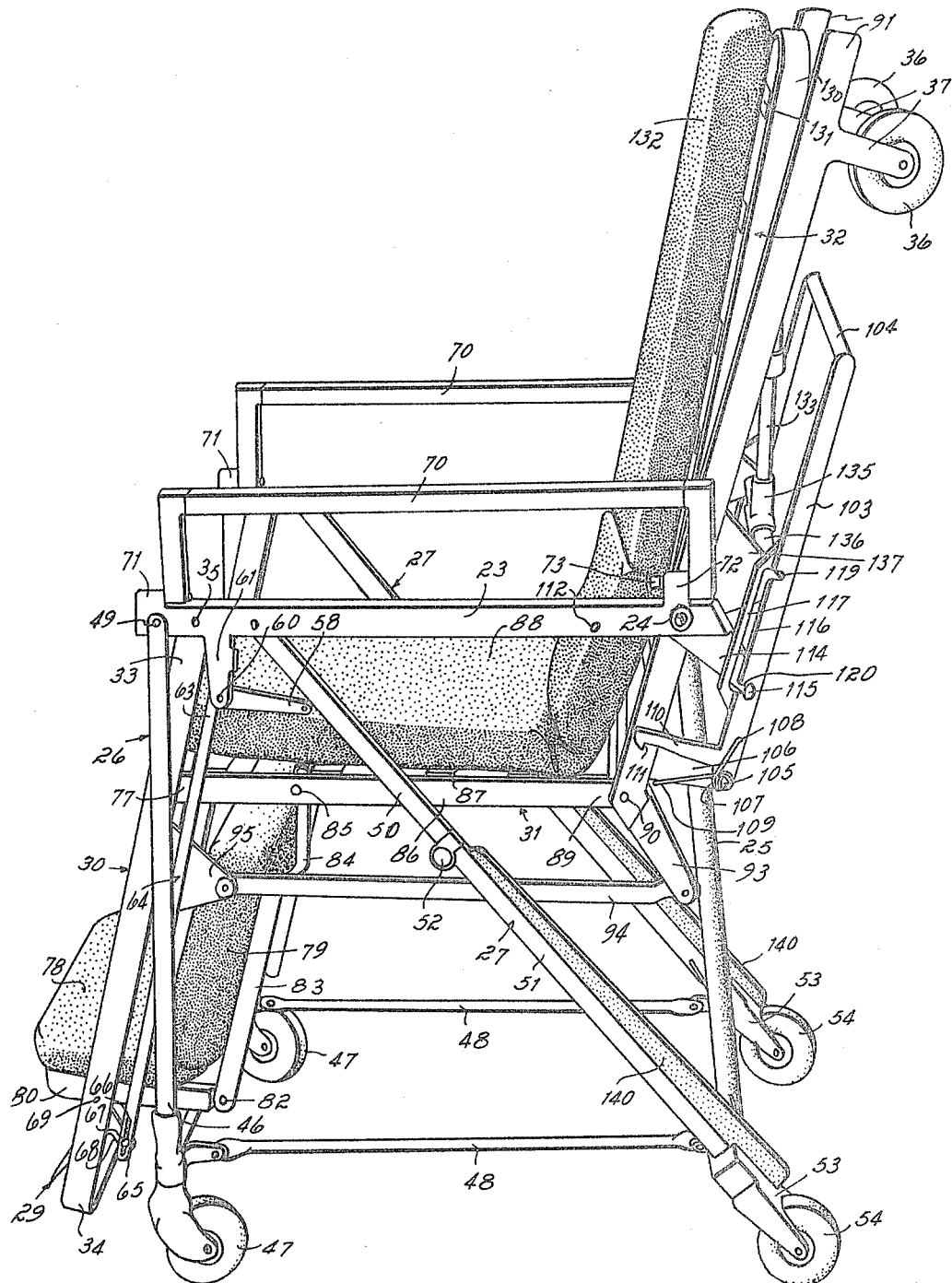

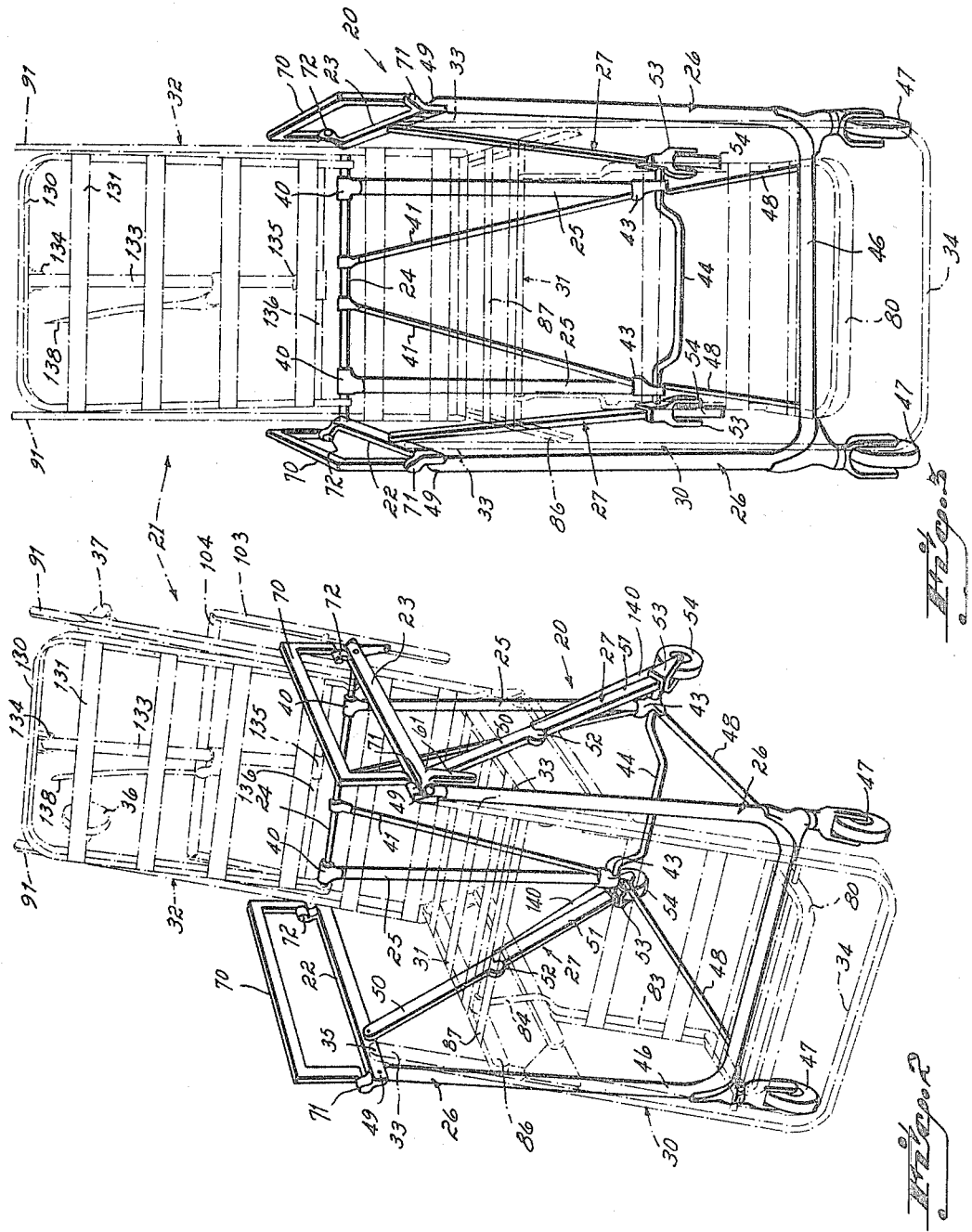

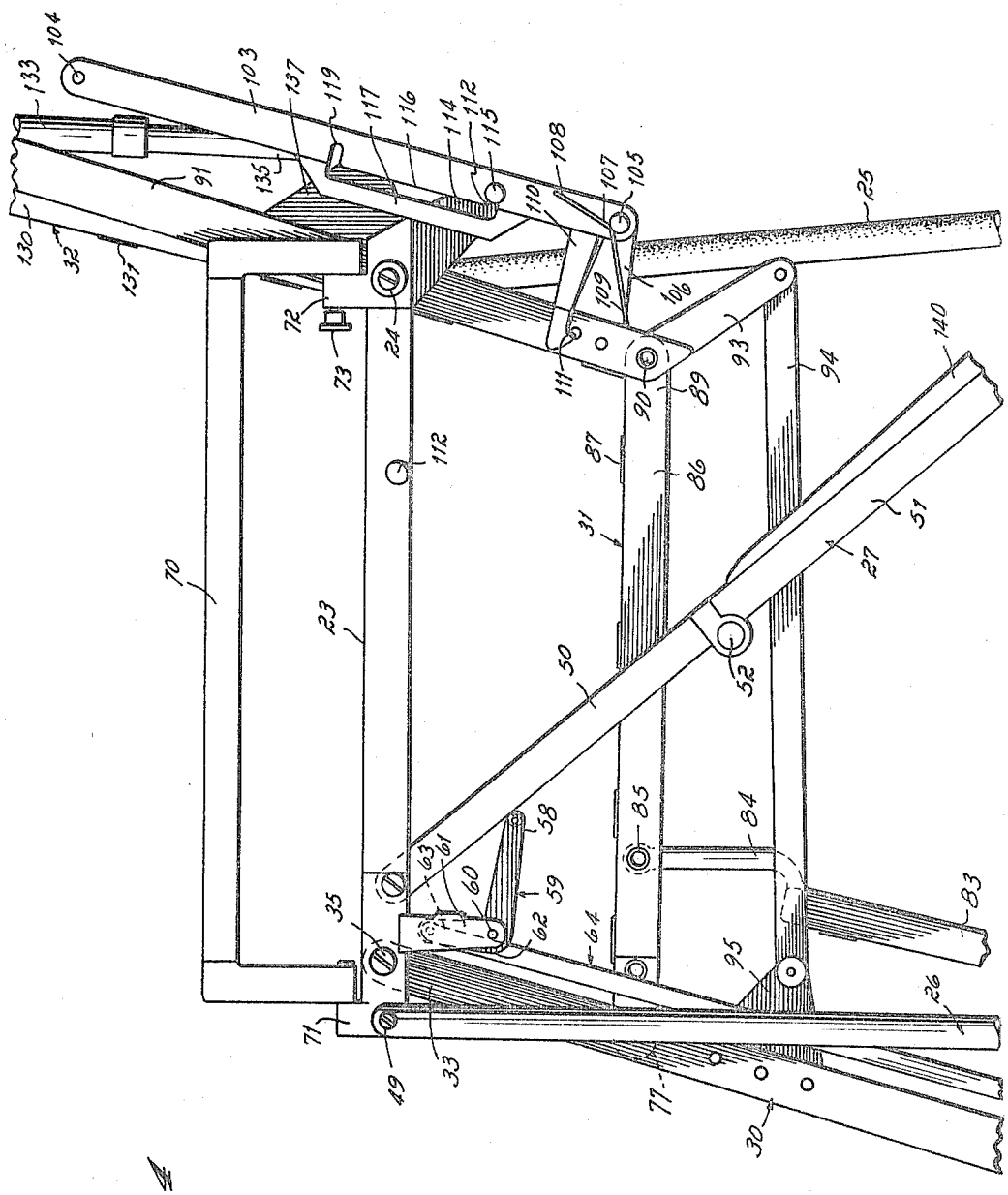

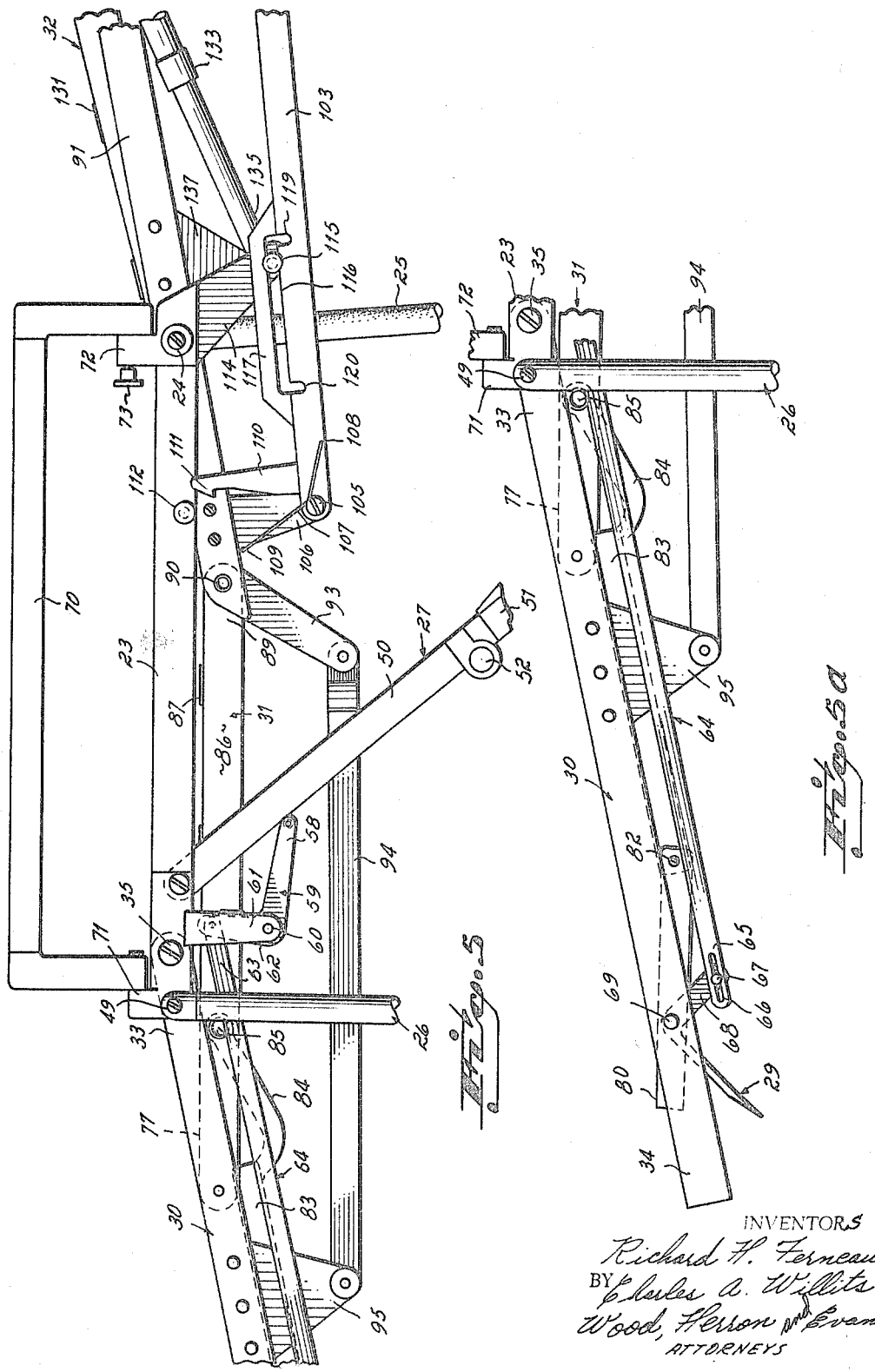

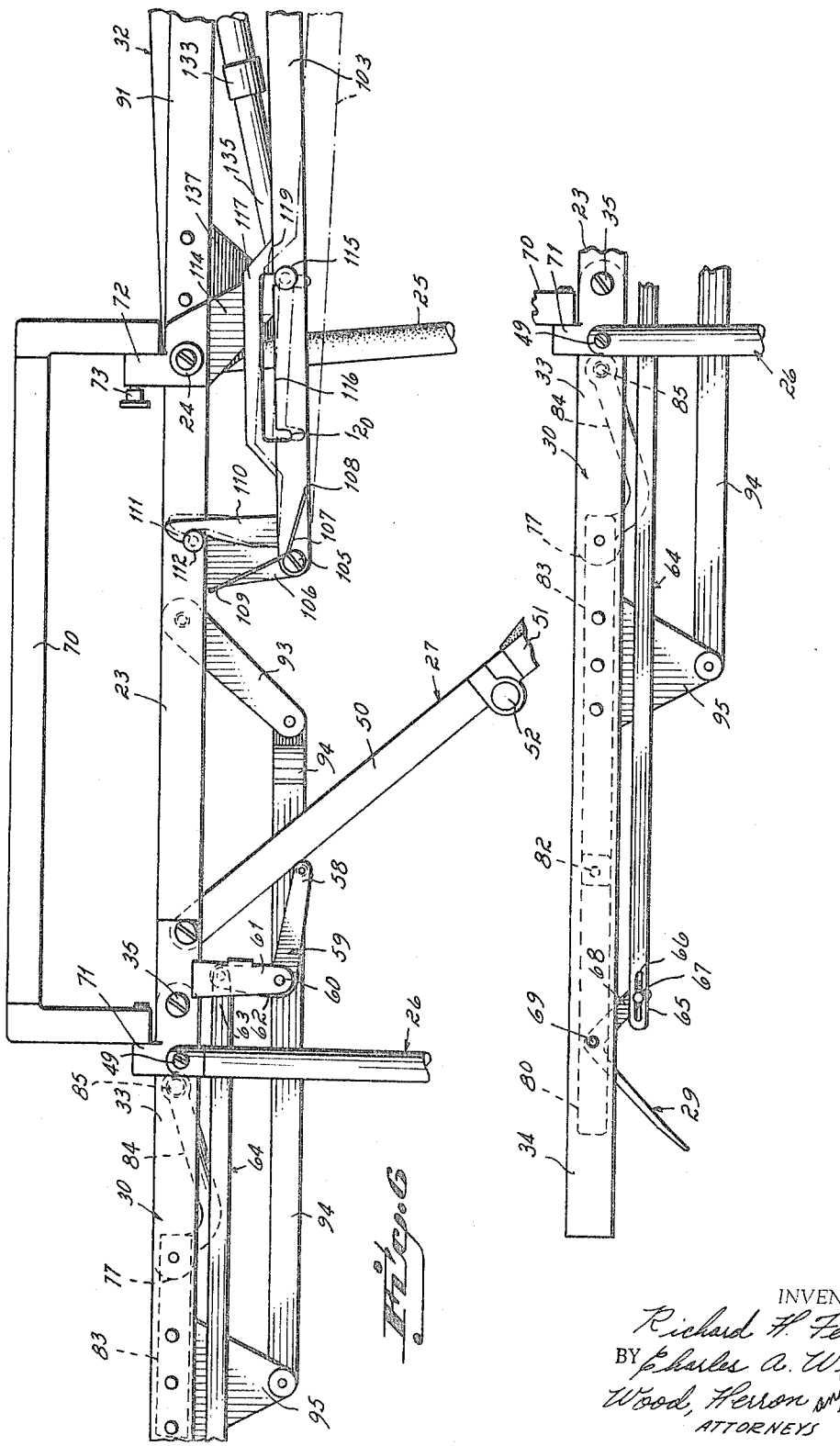

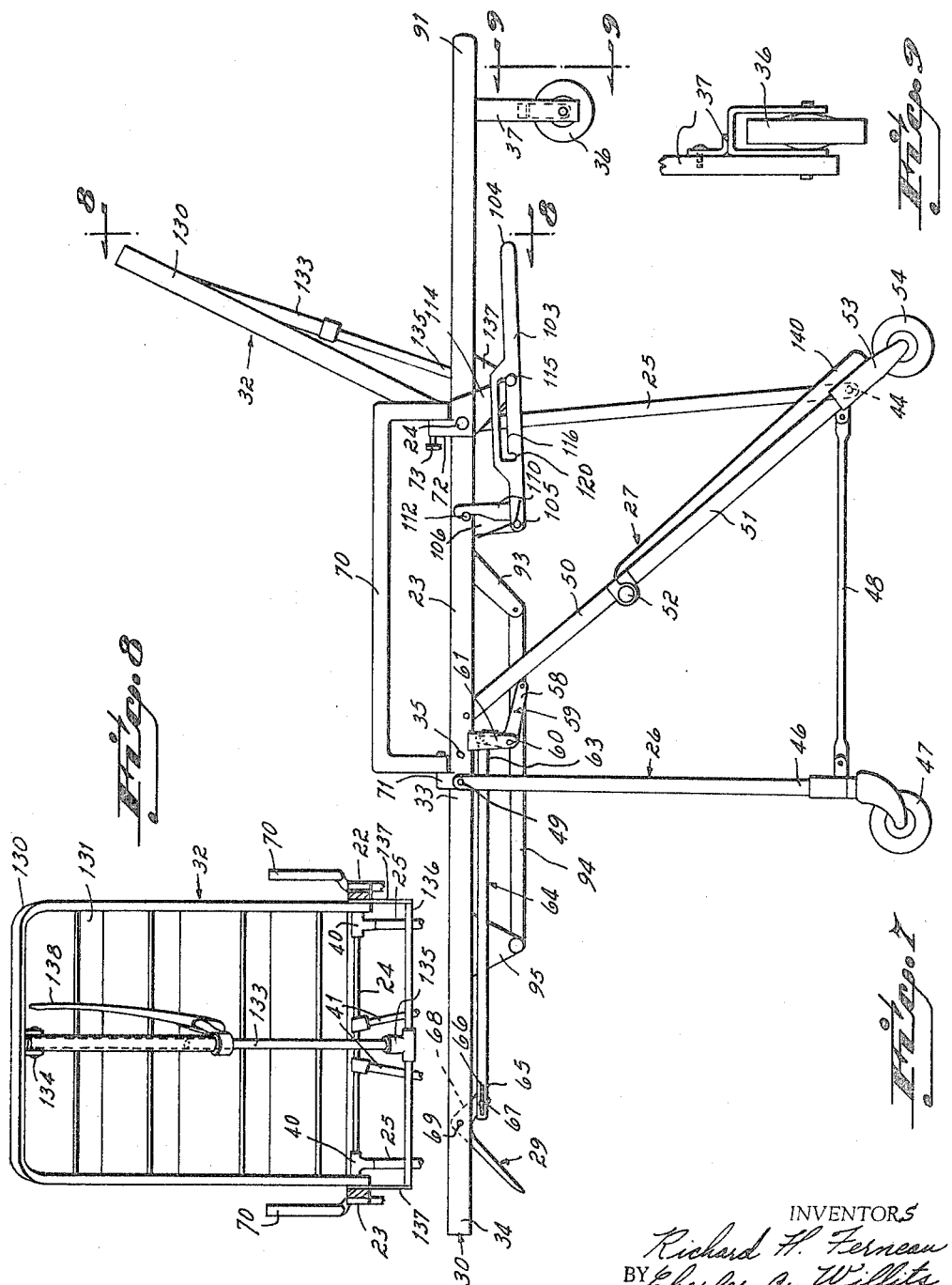

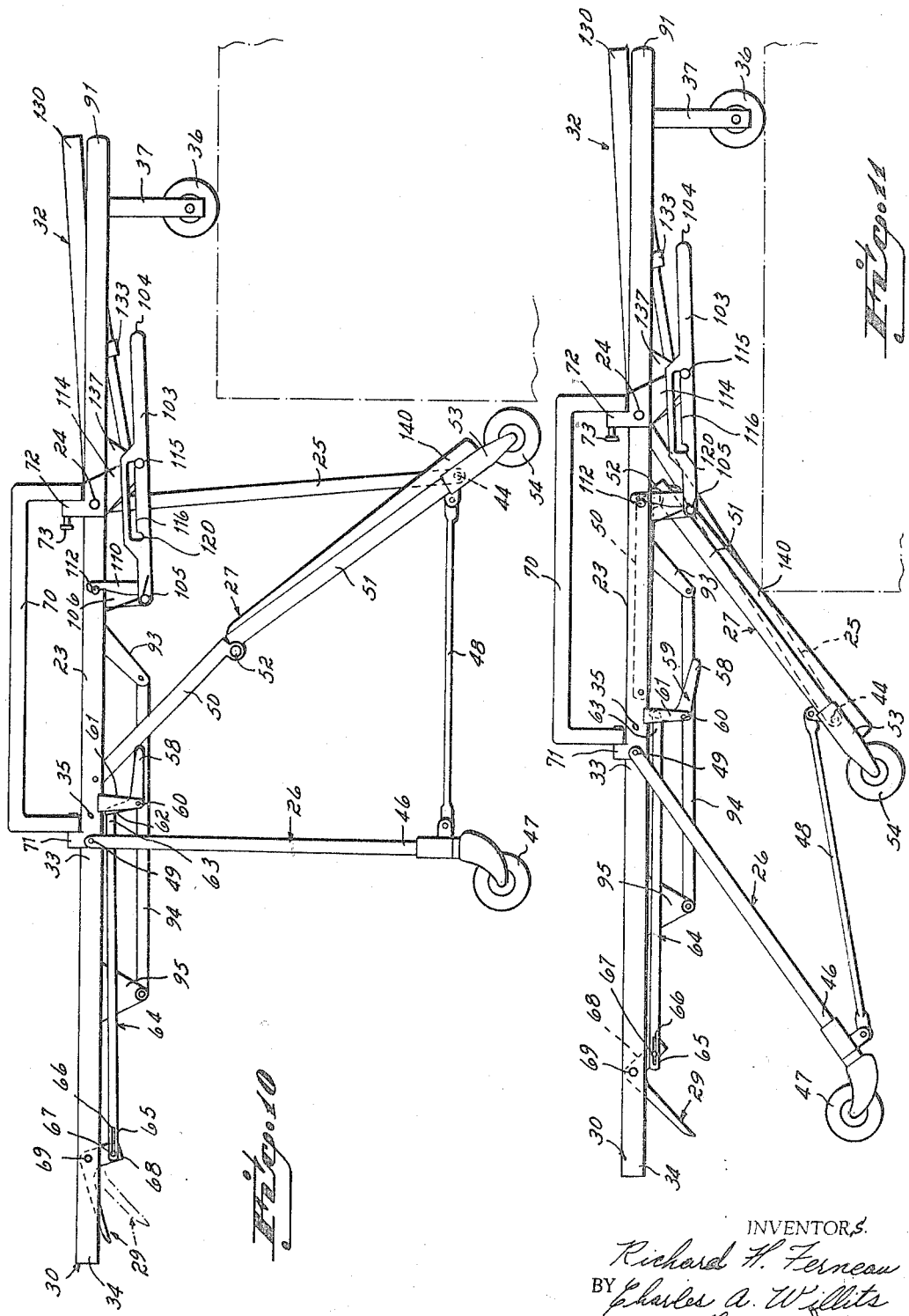

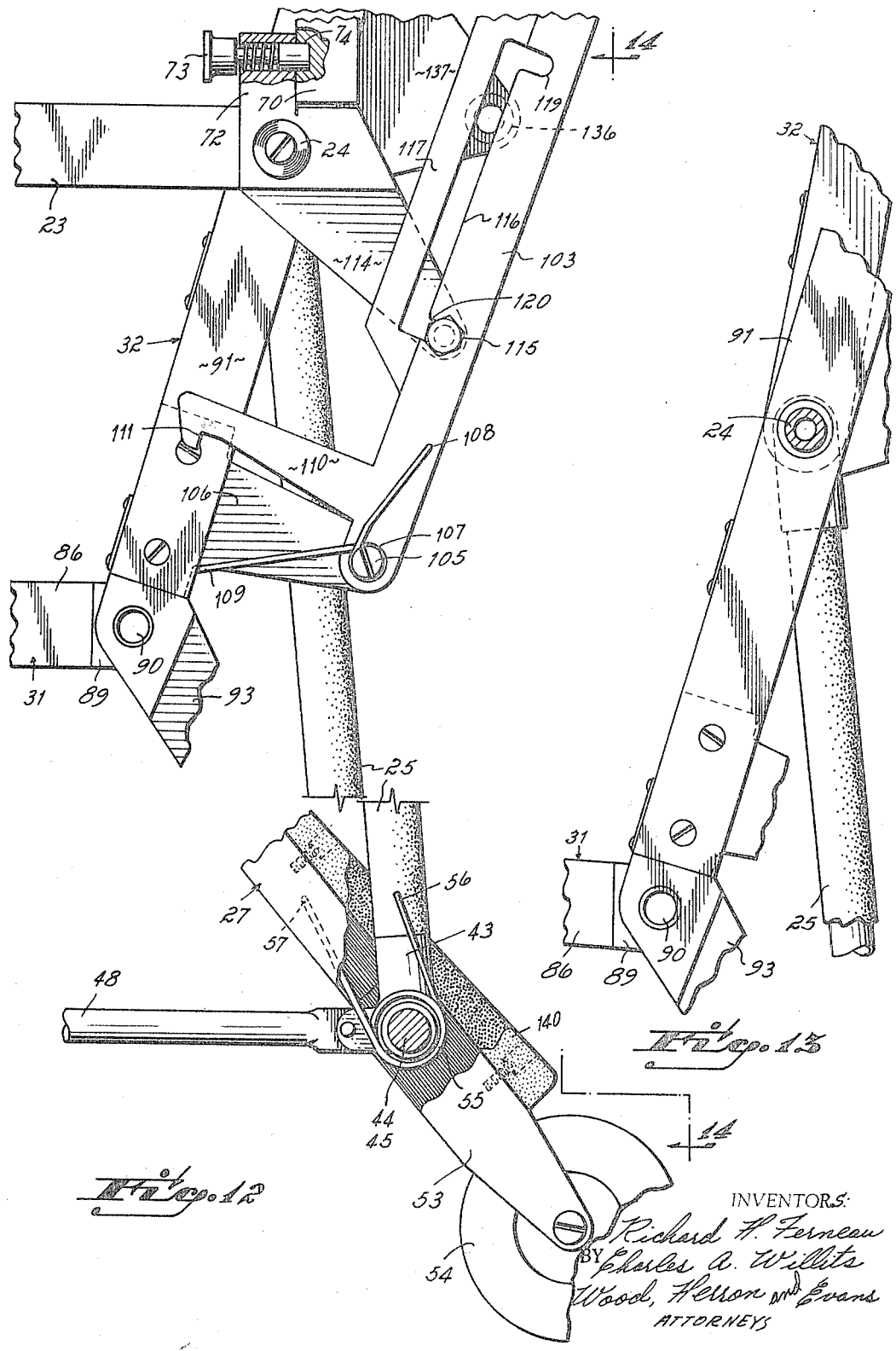

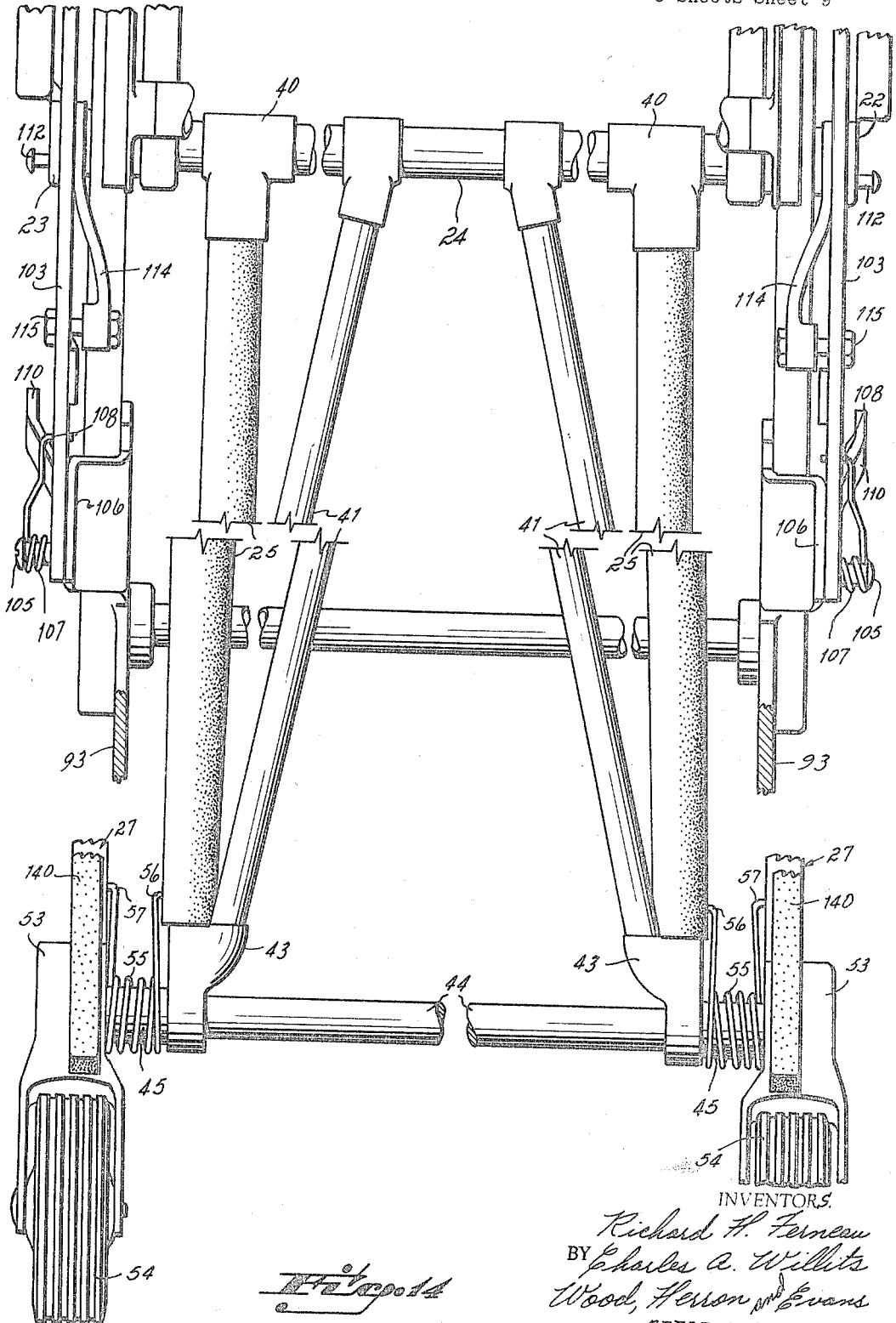

3,289,219
COMBINED AMBULANCE CART AND
ROLLING CHAIR
Richard H. Ferneau, Washington Court House, Ohio, and
Charles A. Willits, Los Angeles, Calif., assignors to
Burt Weil, Cincinnati, Ohio
Filed Oct. 12, 1964, Ser. No. 403,155
10 Claims. (Cl. 5—82)

This invention relates to an ambulance cart which is convertible to a rollable chair and more particularly the invention is directed to the combination of an ambulance cart which has legs which are foldable to permit the cart to be slid into an ambulance.

The invention is directed particularly to a solution to the problem of transporting a patient from his bed in his home to a bed in a hospital and is concerned specifically with certain of the more difficult and tiring aspects of such patient transportation. It is not unusual to find a patient in an old house having a narrow doorway leading into a narrow hall, the bedroom being on a second floor, the only access to which is provided by a narrow stairway having a tight 180° landing. In coping with such conditions, it is common practice to lift the patient from a reclined position in the bed to an upright position in a small chair, to carry the patient down the stairs in the chair and thereafter to load the patient onto an ambulance cart from the chair. The patient is then wheeled from the cart into the ambulance. It is sometimes possible to carry a patient through that tortuous geography on a stretcher, but the movement from doorway into narrow hallway and around a tight landing is so difficult that it is usually preferable to carry the patient in an upright position in a chair. In any event, existing equipment is not well-suited to this transportation problem.

In Patent No. 3,137,511, assigned to the assignee of the present invention, a device referred to as a stair-chair has been proposed. That device is suitable for manipulating the tight corners and the landings and the like but it does not have the features of an ambulance cart.

As a solution to the problems of patient transportation, it has been an objective of the present invention to provide a device having three principal attributes: it is convertible to a wheel chair, it is convertible to a flat rolling ambulance cart, and it has provisions for being rolled smoothly into an ambulance with the legs which support the cart being folded up against the cart.

A number of advantages are derived from the present invention. First, with only one piece of equipment all of the patient transportation functions can be handled. Second, the patient need be lifted only once in the complete transportation operation from home bed to hospital bed. Third, the patient can be rolled in a comfortable chair position supported on four well-spaced wheels and even with arm rests so that the patient has a feeling of complete security.

All of these features are made possible by a device which weighs no more than an average ambulance cot and which is narrow enough to permit it to pass through a twenty-eight inch wide doorway into a thirty inch wide hallway. More specifically, the cart is no wider than about twenty-two inches. This is a normal dimension for an ambulance cart and it is required if the cart is to negotiate the tight turns described above, but also it permits the cart to be disopsed on one side of an ambulance while permitting an attendant to sit along side of the patient on the other side of the ambulance.

It is another object of the invention to provide an ambulance cart which is structurally sound, which is narrow enough to meet the requirements of practice in ambulance carts and which incorporates the principal attributes referred to above without any perceptible functional sacrifice on any of them.

The structural features will be described in more detail in the following detailed description in which:

FIG. 1 is a perspective view of the ambulance cart of the invention,

FIGS. 2 and 3 are perspective views of a cart showing the support frame portion in solid lines and the panel and seat portion in broken lines, FIG. 4 is a fragmentary side elevational view of the central portion of the cart, FIG. 5 is a view similar to FIG. 4 showing the cart in a position which it assumes when it is partially converted to stretcher condition, FIG. 5a is the side elevational view of the forward extremity of the cart illustrated in FIG. 5, FIG. 6 is a view similar to FIGS. 4 and 5 showing the cart fully converted to a stretcher, FIG. 6a is the side elevational view showing the forward extremity of the cart illustrated in FIG. 6, FIG. 7 is a side elevational view of the cart in stretcher condition with the back rest in elevated position, FIG. 8 is a fragmentary end elevational view partially in section taken along lines 8—8 of FIG. 7, FIG. 9 is a fragmentary end elevational view of the rear wall taken in the direction of lines 9—9 of FIG. 7, FIG. 10 is a side elevational view of the cart in stretcher condition illustrating the manner in which it is introduced into a vehicle, FIG. 11 is a view similar to FIG. 10 illustrating further progress of introducing the cart into a vehicle, FIG. 12 is a fragmentary side elevational view of the rear legs and bracing structure, FIG. 13 is a fragmentary side elevational view partially in section illustrating the manner in which the rear legs and back panel are pivoted to the frame, FIG. 14 is a fragmentary end elevational view taken in the direction of lines 14—14 of FIG. 12.

*General description of structure and operation*

Referring to FIGS. 2 and 3, the cart is constituted by a main support section 20 shown in solid lines and a seat and stretcher section 21 shown in broken lines which nests into the main support section. The main support section includes a horizontal, rectangular three-sided frame having side rails 22 and 23 joined at their rearward ends to a pivoting bar 24. It is supported at its four corners by rear legs 25 and front legs 26. The legs are braced in a normally vertical attitude by a toggle brace 27 on each side of the frame, each brace being connected at its forward end to the forward corner of the frame and at its lower end to the lower end of the rear leg. The toggle brace may be broken or released through the actuation of a lever 29 through linkage which will be described in greater detail below. When the brace 27 is broken, the legs may be swung in a forward direction from the position perpendicular to the three-sided frame 22–24 to a position in which they are substantially parallel to the three-sided frame.

The stretcher portion shown in broken lines in FIG. 2 comprises a leg panel 30, a seat panel 31, and a back panel 32, the panels being hinged serially to each other for movement between a chair position as shown in FIGS. 2 and 3 in which the legs and back panels are generally vertical and the seat panel horizontal and a stretcher position as shown in FIG. 10 in which all panels are horizontal. The back panel is pivotally mounted on pivot bar 24 forming a part of the main support 20. The leg panel 30 has upwardly projecting extensions 33 of a U-shaped frame 34 which are pivoted at their upper ends to the side rails 22 and 23 on pivot pins 35. The pivotal connection of the back panel 32 and the leg panel 30 to the main support combined with the pivotal connection of the seat panel to the front and back panel provides a parallelogram interconnection of the stretcher portion 21 to the main support 20 permitting it to pivot easily from the chair position illustrated in FIG. 2 to the stretcher position illustrated in FIG. 10.

The back panel has a pair of auxiliary wheels 36 mounted on brackets 37 integral with the upper end of the panel. Means are provided to lock the stretcher section 21 in its stretcher position, as illustrated in FIG. 10, with the auxiliary wheels projecting downwardly in a position to engage the platform of an ambulance, or the like, with which the cart is to be used.

It can be seen that the main support 20 has its main structural elements so oriented as to permit the swinging of the legs from a vertical position to a generally horizontal position as well as to receive the stretcher portion and permit the stretcher portion to swing from a chair condition of FIGS. 2 and 3 to a stretcher condition of FIG. 10. When in the chair position of FIGS. 2 and 3, a patient may be wheeled in a sitting position through tortuous passageways which are normally difficult to negotiate and when the stretcher is brought out to the transporting vehicle, the stretcher section can be shifted, with the patient aboard, from the chair position to the stretcher position, illustrated in FIG. 10, and gently rolled into the transporting vehicle on the auxiliary wheels 36, the attendant causing the release of the legs through the manipulation of lever 29 as the cart is being rolled into the vehicle.

As will be hereinafter described in detail, the invention provides operating structure in combination with the main support and stretcher sections which not only permits the stretcher section to be mounted for articulation on the main support but permits it to be securely locked in its stretcher condition so that when the three panels by which it is constituted are in a horizontal position they form a simple beam permitting the entire structure, with a patient aboard, to be supported at the respective ends of the structure and rolled into the transport vehicle. Further, the operating elements are mounted in part on the swinging leg and back panels in such a way as to permit their actuation to lock the stretcher portion to the main support 20 and to permit the actuation of the toggle leg brace.

*Specific description of structural details*

The rear legs 25 have T-fittings 40 fixed on their upper ends, the T-fittings being fixed to the pivot bar 24. Angulated braces 41 are also fixed at their upper ends to the bar 24 and are fixed at their lower ends to fittings 43 on the lower ends of the legs to provide additional bracing support to the legs. At the lower end of the rear legs 25, a bar 44 is rotatably mounted in the casting 43, the bar having ends 45 projecting laterally outwardly and fixed to the lower end of the braces 27. The bar 44 provides an interconnection of the two side braces 27 to transmit any movement of one of the braces to the other of the braces. Member 44, thus forms an interconnection of the braces 27 from one side of the cart to the other and well out of the way of the swinging stretcher portion so that a single operating lever breaking one brace 27 will effect the breaking of the other brace.

The forward legs 26 are formed in part by a U-shaped tube 46 which has wheeled casters 47 fixed at its lower end. Longitudinally extending rods 48 interconnect the lower ends of the forward legs 26 with the rearward legs 25 so that the legs swing together as a unit and so that the braces 27 connected to the rear legs serve also to brace the forward legs 26. The upper ends of the forward legs 26 are pivoted on pins 49 to the side rails 22 and 23.

Each brace 27 is formed by an upper link 50 and a lower link 51 interconnected by an over-center hinge 52. The lower link is fixed to the end 45 of the cross bar 44. Projecting downwardly from the interconnection of the link 51 and the cross bar end 45 is a yoke 53 supporting rear wheel 54.

As a diagonal extension of the brace link 51, the yoke 53 extends rearwardly of the rear leg 25 thereby extending the length of the wall base beyond the longitudinal distance between the front and rear legs thereby providing greater stability to the cart.

As illustrated in FIGS. 12 and 14, a spring 55 is coiled about each rod end 45 and has its ends 56 and 57 fixed to the leg 27 and brace link 51 respectively. The springs are stressed in such a way as to urge the legs and brace into the normally erect condition illustrated in FIG. 1. The upper link 50 is engageable by an arm 58 on a bell crank lever 59 which is pivoted at 60 to a downwardly depending post 61 integral with the side rail 23. The bell crank lever has another arm 62 pivotally connected to an end 63 of actuator link 64. The other end 65 of the link has a slot 66 through which a pin 67 projects. The pin 67 is fixed to an arm 68 of the bell crank operator 29 which is pivoted at 69 to the leg panel. When the actuator lever 29 is operated, it pulls on the actuator link 64 to pivot the bell crank lever 59. The arm 58 of that bell crank lever bears against the upper brace link 50 swinging it upwardly to bring the hinge 52 past the over-center position thereby breaking the brace 27.

The slot and pin connection 66 and 67 is not absolutely necessary to the operation of the invention, but it does prevent the actuator rod from forcibly swinging the lever 29 in scissors fashion with respect to the leg panel to which it is pivoted to the extent that it might catch the fingers of an attendant and pinch them.

As optional features, the cart may be provided with U-shaped guards 70, each being pivoted at its free ends to brackets 71 and 72 which are integral extensions of the side rails 22 and 23. Each rearward bracket 72 is provided with a spring loaded pin lock 73 which is slidable into and out of engagement with a bore 74 (FIG. 12) in the guards 70 to hold the guards in a vertical operative position and to permit it to swing downwardly to a released position. In the downward released position, the stretcher is more accessible when it is necessary to slide a patient from a bed to a stretcher.

The seat panel 31 is pivoted at its forward end 77 to the U-shaped frame 34 to form a part of the parallelogram structure referred to above. The leg panel 30 supports a foot cushion 78 and a leg cushion 79. The foot cushion is mounted on a foot rest 80 which is pivoted at 69 intermediate its ends to the U-shaped frame 34 and at its rearward ends to the lower end 82 of a leg rest 83. The upper ends 84 of the leg rest are pivoted at 85 to the seat panel 31. Thus, a subsidiary parallelogram is formed by the interconnection of the U-shaped bar 34 and leg rest 83 as parallel elements and the seat panel 31 and the foot rest 80 as parallel elements. When the leg panel is swung from the seat position, illustrated in FIG. 1, to the stretcher position, illustrated in FIG. 10, the subsidiary parallelogram collapses to straighten out the foot pad 78 with respect to the leg pad 79 to make a flat stretcher.

The seat panel 31 is formed by a pair of spaced longitudinal members 86 joined by cross members 87 which support a seat pad 88. The panel is pivoted at its rearward end 89 to the back panel 32 on a transverse pivot rod 90.

The back panel 32 comprises two side bars 91 pivoted intermediate their ends on the pivot bar 24. At their lower ends, they are joined to pivot rod 90 on the seat panel and on their opposite ends they support bracket 37 in which wheels 36 are journalled. Extensions 93 project downwardly from the side bars 91 and are pivotally connected to braces 94. The forward ends of braces 94 are pivoted to ears 95 integral with U-shaped frame 34 of the leg panel 30. The braces 94 interconnect the back and leg panels to provide a rigid bracing of them when they are swung to the stretcher position of FIG. 10.

A latch mechanism for holding the interconnected panels in the stretcher position of FIG. 10 is mounted between the back panel and the three-sided frame 22–24. The lath mechanism comprises a lever arm 103 having a handle 104 formed as a transverse bar at one end thereof and pivoted on a pin 105 to bearing plates 106 integral with the side bars 91 of back panel 32. A spring 107 is coiled about the pin 105 on each side of the mechanism and has its ends 108 and 109 connected to the lever 103 and the plates 106 respectively, to urge the lever 103 to swing toward the back panel 32. The lever 103 has an integral latch arm 110 having a hook 111 at its ends which is engageable with the pin 112 fixed to the rails 22–23. A lug 114 projects downwardly from each rail 22 and 23 and has a pin 115 at its end. The pin rides in a slot 116 in a plate 117 fixed to the arm 103. The slot 116 has hook portions 119 and 120 which provides a locking or bracing function as will be described.

When the stretcher portion is in the seat condition, illustrated in FIG. 1, pin 115 is disposed in slot 120 and prevents the stretcher portion from swinging out of the seat condition. When the panels are disposed in the stretcher position, illustrated in FIG. 10, the pin 115 is in the hook portion 119 and provides part of the lock means which holds the panels in the horizontal stretcher position. Additional hook slots could be located between the hooks 119 and 120 to permit the panels to be positioned and latched at a plurality of angulated positions if that is desired.

When the panels are in the horizontal stretcher condition, the hook 111 on the arm 110 locks over the pin 112 on the rails 22–23. Thus, at the location of the greatest weight concentration, namely; the hips of the patient, the engagement of the hook 111 with the pin 112 on the arm directly resists any tendency of the back and seat panels to swing downwardly to collapse the stretcher. Additionally, the force on the back panel is translated to the pin 115 through the bearing plates 106 and the lever 103 and its hook slot 119.

The back panel has a back rest 130 which is pivoted on the pivot bar 24 and which has cross members 131 which support a back pad 132. The back rest has a telescoping brace 133 pivoted at its upper end 134 to the back rest and at its lower end 135 to a cross bar 136, the cross bar being mounted on depending lugs 137. The said lugs 137 are fixed to the side bars 91. The telescoping brace has a pivot operating lever 138 by which it is possible to fix the angular position of the back rest with respect to the back panel in any one of the several positions.

In order to facilitate the introduction of the cart into the ambulance, the lower link 51 of the brace 27 has been provided with a nylon skid 140. As shown in FIG. 11, as the cart is thrust into the platform of an ambulance or the like the skid is brought into engagement with the platform surface as the legs swing upwardly to permit the convenient sliding of the cart onto the platform.

*Operation*

Consider the operation to begin when the cart is in the stretcher position of FIG. 10. When in that position, the cart can be rolled along side a bed and the guard 70 dropped by releasing the pin lock 73. A patient can then be slid from the bed onto the cart. Let it be assumed that the extreme conditions of building construction are encountered and it is necessary to move the patient through a narrow doorway, through a narrow hall and down steps having a narrow landing. The first step in the operation probably would be to convert the stretcher, while the patient is in it, to the chair condition of FIG. 1. That conversion is performed simply by operating the lever arm 103 to pivot the latch arm 110 and its hook 111 away from the pin 112 which provides the principal lock to hold the stretcher in the condition of FIG. 10. The pivoting of the lever also frees the pin 115 on the lug 114 from its engagement with the hook portion 119 of the slot 116. With the manipulation of the lever 103, the stretcher frame is free to articulate to swing the back panel and the leg panel to generally vertical positions. Because the patients' weight is divided substantially equally on either side of the pivot bar 24, the stretcher frame is in an approximately static balance so that only a modest amount of effort is required on the part of the operator to swing the stretcher frame to the chair position. Also, because of the approximate static balance, the patient will not be thrown violently forward by his own weight when the lever 103 is actuated. The stretcher frame is locked in the chair attitude of FIG. 1 by the engagement of the pin 115 with the hook portion 120 of the slot 116. It is, therefore, possible to manipulate the chair by applying force to the stretcher frame without shifting the stretcher frame out of the chair attitude of FIG. 1. The operator may then wheel the patient through the tight doorways and if necessary tilt the patient and chair back on the rear wheels 54 if an extremely tight turn is required. In going down stairs, attendants gripping the two ends of the stretcher frame can lift the patient and carry him while he is sitting in the chair and any narrow landing can easily be negotiated.

After the patient has been brought to the ambulance, lever 103 can once again be manipulated and by bearing down on the back panel 32, the stretcher can be returned to the stretcher position of FIG. 10. This conversion can be facilitated if the patient leans back slightly to apply pressure on the back panel so that his weight is more evenly distributed on either side of the pivot bar 24. The hook 111 rides over the pin 112 on each side of the frame to snap into a locking condition. The patient may then be rolled with his head end leading toward the back of the ambulance until the auxiliary wheels 36 engage the ambulance platform. The cart is then rolled on the wheels 36 until the rear legs 25 engage the back of the ambulance. The attendant then operates the lever 29 causing bell crank lever 59 to engage the upper link 50 of the toggle brace thereby breaking the toggle brace to permit the legs to swing upwardly from their vertical position to a position substantially parallel to the stretcher frame. The legs are forced to swing in that upward position by a continued thrust of the cart by an attendant gripping the U-shaped frame 46 of the leg panel. At this time, or perhaps immediately before rolling the patient into the ambulance, the back rest 130 might be pivoted upwardly so that the patient can ride in an upright position this being particularly important in cardiac cases.

At the hospital, the procedure is reversed so that the cart is rolled out of the back of the ambulance. After the front and rear wheels clear the ambulance platform, the legs automatically drop down and the spring 55 causes the brace 27 to snap into its over-center bracing position. The cart can then be conveniently rolled into the hospital.

We claim:
1. A cart comprising,
   a three-sided, horizontal, rectangular frame,
   four downwardly extending legs pivotally mounted on the four corners of said frame,
   releasable means normally bracing said legs perpendicular to said frame, means for actuating said releasable means to permit said legs to swing generally parallel to said frame,
a stretcher frame constituted by a leg panel, a seat panel and a back panel hinged serially to each other, and
means mounting said stretcher frame on said three-sided frame for movement between a chair position in which said seat panel is horizontal and said leg and back panels are generally vertical, and a stretcher position in which all panels are horizontal.

2. A cart comprising,
a frame,
four downwardly extending legs pivotally mounted on the four corners of said frame,
releasable means normally bracing said legs perpendicular to said frame,
means for actuating said releasable means to permit said legs to swing generally parallel to said frame,
a stretcher frame constituted by a leg panel, a seat panel and a back panel hinged serially to each other, and
means mounting said stretcher frame on said first mentioned frame for movement between a chair position in which said seat panel is horizontal and said leg and back panels are generally vertical, and a stretcher position in which all panels are horizontal.

3. A cart comprising,
a horizontal, rectangular frame,
four downwardly extending legs pivotally mounted on the four corners of said frame,
releasable means normally bracing said legs perpendicular to said frame,
means for actuating said releasable means to permit said legs to swing generally parallel to said frame,
a stretcher frame constituted by a leg panel, a seat panel and a back panel hinged serially to each other,
auxiliary wheels mounted on said back panel,
an operator mounted on said leg panel,
means connecting said operator to said actuating means, and
means mounting said stretcher frame on said first mentioned frame for movement between a chair position in which said seat panel is horizontal and said leg and back panel are generally vertical, and a stretcher position in which all panels are horizontal.

4. A cart comprising,
a horizontal, rectangular frame,
four downwardly extending legs pivotally mounted on the four corners of said frame,
a diagonal toggle brace on each side of said cart connecting the lower end of a rearward leg to the forward end of said frame,
each said brace having an upper link and a lower link connected by an over-center hinge,
a cross bar rigidly interconnecting the lower ends of said lower links,
means at one side of said frame for swinging one of said upper links to a past-center position to break said braces,
a stretcher frame constituted by a leg panel, a seat panel and a back panel hinged serially to each other, and
means mounting said stretcher frame on said first mentioned frame for movement between a chair position in which said seat panel is horizontal and said leg and back panels are generally vertical, and a stretcher position in which all panels are horizontal.

5. A cart comprising,
a horizontal, rectangular frame,
two forward and two rearward downwardly extending legs pivotally mounted on the four corners of said frame,
a diagonal toggle brace on each side of said cart connecting the lower end of a rearward leg to the forward end of said frame,
each said brace having an upper link and a lower link connected by an over-center hinge,
a lever pivoted on said frame and engageable with said brace to break said over-center hinge,
a stretcher frame constituted by a leg panel, a seat panel and a back panel hinged serially to each other,
means mounting said stretcher frame on said first mentioned frame for movement between a chair position in which said seat panel is horizontal and said leg and back panels are generally vertical, and a stretcher position in which all panels are horizontal, and
an operator pivoted at the free end of said leg panel,
and linkage means connecting said operator to said lever.

6. A cart according to claim 5 in which said linkage means includes a pin and slot connection permitting pivotal movement of said leg panel without pivoting said operator.

7. A cart comprising,
a horizontal, rectangular frame,
four downwardly extending legs pivotally mounted in the four corners of said frame,
releasable means normally bracing said legs perpendicular to said frame,
means for actuating said releasable means to permit said legs to swing generally parallel to said frame,
a stretcher frame constituted by a leg panel, a seat panel and a back panel pivot serially to each other, and
means mounting said stretcher frame on said first mentioned frame for movement between a chair position in which said seat panel is horizontal and said leg and back panels are generally vertical, and a stretcher position in which all panels are horizontal,
a hook mounted on said stretcher frame adjacent the pivot connection of said seat and back panel,
a pin on said rectangular frame immediately above said hook,
said hook being engageable with said pin to fix said stretcher frame in stretcher position.

8. A cart comprising,
a horizontal, rectangular frame including a pivot bar,
four downwardly extending legs pivotally mounted on the four corners of said frame said rearward legs being mounted on said pivot bar,
releasable means normally bracing said legs perpendicular to said frame,
means for actuating said releasable means to permit said legs to swing generally parallel to said frame,
a stretcher frame constituted by a leg panel, a seat panel and a back panel hinged serially to each other,
means mounting said stretcher frame on said first mentioned frame for movement between a chair position in which said seat panel is horizontal and said leg and back panels are generally vertical, and a stretcher position in which all panels are horizontal,
said mounting means including means mounting said back panel on said pivot bar,
said back panel including a back rest pivoted on said pivot bar.

9. A cart comprising,
a horizontal, rectangular frame,
four downwardly extending legs pivotally mounted on the four corners of said frame,
a diagonal toggle brace on each side of said cart connecting the lower end of a rearward leg to the forward end of said frame,
each said brace having an upper link and a lower link connected by an over-center hinge, a plastic skid fixed to the lower link of each brace,
means at one side of said frame for swinging one of said upper links to a past-center position to break said braces, said lower link and skid swinging to a cart supporting position as said legs pivot toward said frame,
a stretcher frame constituted by a leg panel, a seat panel and a back panel hinged serially to each other, and means mounting said stretcher frame on said first mentioned frame for movement between a chair position in which said seat panel is horizontal and said leg and back panels are generally vertical, and a stretcher position in which all panels are horizontal.

10. A cart according to claim 5 in which said linkage means includes lost motion means permitting the pivoting of said leg panel with respect to said horizontal frame.

References Cited by the Examiner
UNITED STATES PATENTS

| 2,747,919 | 5/1956 | Ferneau et al. | 5—82.2 X |
| 2,841,438 | 7/1958 | Weil | 5—82.2 X |
| 2,877,047 | 3/1959 | Weil | 5—82 X |
| 2,877,048 | 3/1959 | Weil | 296—20 |
| 3,039,119 | 6/1962 | Bourgraf et al. | 5—82 |
| 3,147,039 | 9/1964 | Smith et al. | 297—90 |

FRANK B. SHERRY, *Primary Examiner.*

R. D. KRAUS, *Assistant Examiner.*